United States Patent
Pinon

(10) Patent No.: US 12,414,546 B2
(45) Date of Patent: Sep. 16, 2025

(54) ANIMAL LEASH

(71) Applicant: Adam Pinon, Franklin, OH (US)

(72) Inventor: Adam Pinon, Franklin, OH (US)

(*) Notice: Subject to any disclaimer, the term of this patent is extended or adjusted under 35 U.S.C. 154(b) by 2 days.

(21) Appl. No.: 18/510,730

(22) Filed: Nov. 16, 2023

(65) Prior Publication Data

US 2025/0160301 A1 May 22, 2025

(51) Int. Cl.
*A01K 27/00* (2006.01)

(52) U.S. Cl.
CPC .................. *A01K 27/003* (2013.01)

(58) Field of Classification Search
CPC .............. A01K 27/003; A01K 27/00
See application file for complete search history.

(56) References Cited

U.S. PATENT DOCUMENTS

| | | | | |
|---|---|---|---|---|
| 4,971,345 | A * | 11/1990 | Braun | B62H 5/006 280/288.4 |
| 5,099,799 | A * | 3/1992 | Giacobbe | A01K 27/003 119/793 |
| 9,271,476 | B1 * | 3/2016 | Flynn | A01K 27/002 |
| 2013/0092101 | A1 * | 4/2013 | Sylvanowicz | A01K 27/003 119/795 |
| 2015/0335975 | A1 * | 11/2015 | Ahn | A63B 69/38 473/461 |
| 2020/0113155 | A1 * | 4/2020 | Liu | A01K 27/005 |
| 2021/0076641 | A1 * | 3/2021 | DeRosa | A01K 27/002 |
| 2022/0330525 | A1 * | 10/2022 | Cavallaro | A01K 27/002 |
| 2024/0081290 | A1 * | 3/2024 | Palmerton | A01K 27/006 |

* cited by examiner

*Primary Examiner* — Kristen C Hayes
(74) *Attorney, Agent, or Firm* — R. William Graham

(57) ABSTRACT

An animal leash is a cord with unique attributes to simplify the leash structure and ensure the leash safety with the inclusion of metal retainers and poly-coated shrunken tubing about the retainers and associated leash portions to which it is attached.

6 Claims, 5 Drawing Sheets

ANIMAL LEASH

FIELD OF THE INVENTION

The present invention relates to the field of leashes for handling and walking dogs, and more particularly to a leash with improved self slacking collar with an integral leash to a harness.

BACKGROUND OF THE INVENTION

Dogs that are not well leash trained or anxious, or are being walked by an unfamiliar person, are frequently difficult to control. Conventional collars or previously configured rope leaches have been found to be inadequate as the dog may slip out of the collar and escape or in the case of a slip noose cut into the animal's neck without adequately loosening upon release. This problem occurs with current a slip collar or a choke collar having a length of cord or chain with a loop at a first end and the second end passing through the loop. The second end of the collar is either attached to a lead or may be formed integral with the lead. When a dog pulls on the collar, the collar tightens, and the dog cannot slip out. Unfortunately, the current designs do not adequately release and cause the animal anxiety or injury. While use of the slip collar, i.e. choke collar, on a particularly difficult dog accomplishes an objective of keeping the collar and leash on the dog, the dog may pull so hard to cause choking, pain or injury.

As a result of the prior, though simpler leash configuration, there was provided a dog harness which consisted of several straps, one passing around the dog's neck and another passing around the dog's chest, the two straps being connected across the shoulders. The harness is an attempt to provide good control and prevent escaping, while not hurting the dog due the force of pulling being applied to the chest area rather than the dog's neck.

Such harnesses are not as desirable for walking dogs. Putting a harness on an unruly or anxious dog and taking it off at the end of the walk can be difficult and time consuming. Further, the dog may attempt to chew it off. Therefore, an improved dog leash is needed to provide the security of a slip collar with the comfort of a harness and is quick and easy to put on and take off of the dog.

SUMMARY OF THE INVENTION

It is an object to provide a dog leash to overcome the problems of prior known dog leashes.

The invention is directed to an animal leash is formed of a cord which can preferably be a synthetic nylon or polyester woven material, of a minimum diameter of at least ⅜ inch to ½ inch. The leash cord has a handle formed at a first end by a metal retainer having a first cord receiving surface receiving about an inward portion of the cord distal from a terminal end portion of the cord and receiving about the terminal end portion in a second receiving surface of the metal retainer wherein the metal retainer is crimped to retain respectively the inward portion and terminal end portion to form the handle of a size to enable one's hand to grasp the same. A heat shrinkable polymer tubing is disposed over metal retainer and portions and is heat shrunk to further assure retention of the portions as well as protect a user from potential injury in grasping about the metal retainer when is necessary for handling the animal.

At a second end of the cord is formed a smaller loop with a retainer in a similar manner to that above. However, in one embodiment the smaller loop need be large enough to receive a carabiner the through smaller loop. In this embodiment, the carabiner can be used to connect to a conventional collar. In another embodiment, the smaller loop receives a mid portion of the cord to provide a slip noose. Here, it has been learned that with the coupling of the increased diameter cord, and having the smaller loop form with in inner diameter of at least about an inch, the cord is about to more easily restrict and release as is needed and avoid the problems associated with injury or anxiety to the animal.

The formed slip noose can be placed over the head and neck of the dog to be walked and the cord. By virtue of the combined elements, namely the metal retainer which ads weight to the smaller loop, and the thicker cord, when the force is not exerted on the leash, the noose naturally relaxes to a point which does not pose a problem to the animal.

The leash now can remain in a more simplistic form which is adaptable to various sized animals. For example, when a dog is walked, the portion of the lead around the dog's neck will tighten if the dog attempts to escape, but immediately loosen when the dog ceases movement to a point within the leashes relaxed length.

In addition, the constructed leash can also as a safety device. For example, in the construction of the instant leash design, it is contemplated that a user might find himself/herself in need of needing to climb a tree or surface terrain wherein the second end might be wedged in a crevice and the handle can be used to place one's foot in to gain elevation. Accordingly, the resultant dog lead is virtually escape proof.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENTS

Figure 1:
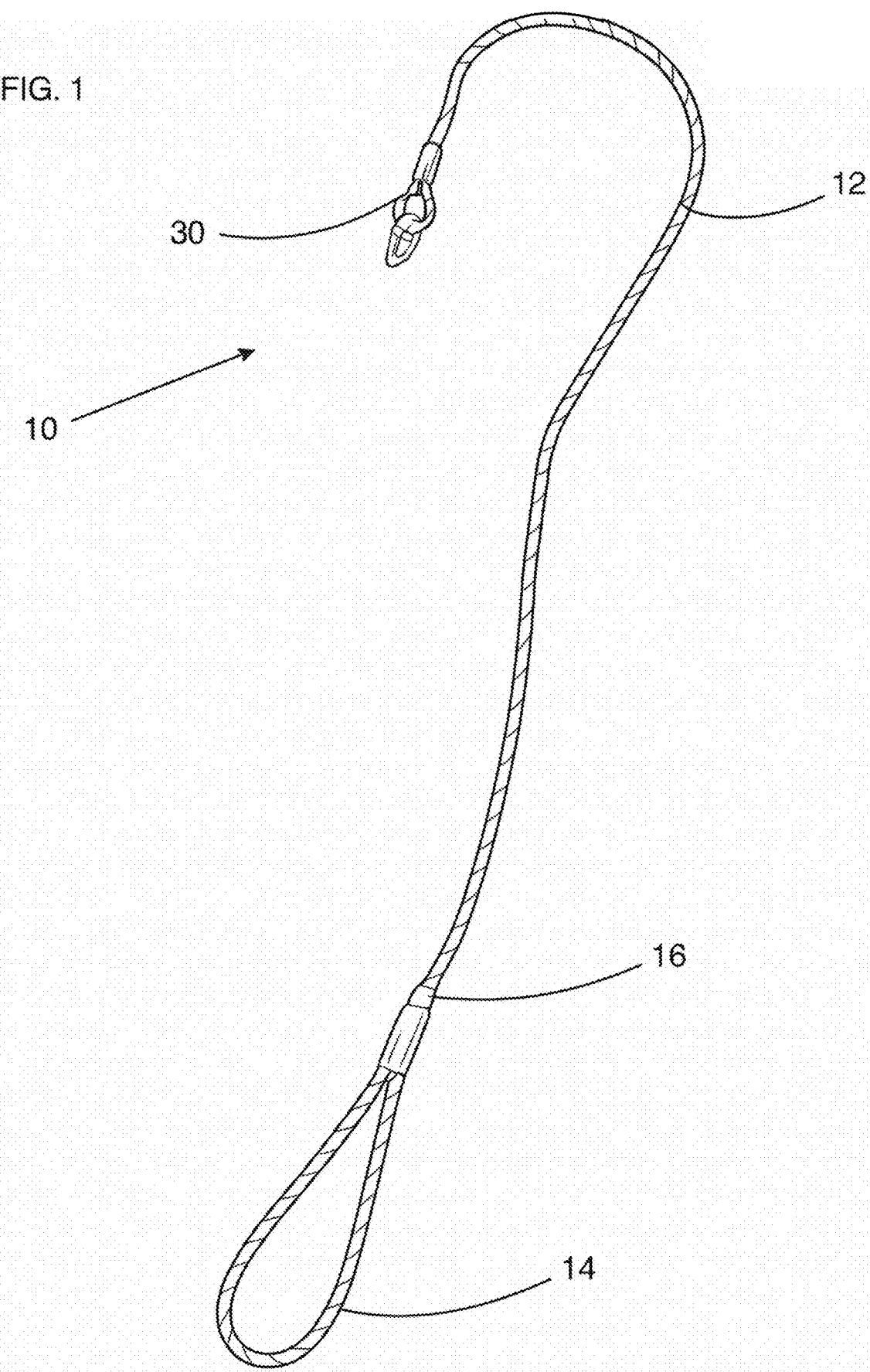
FIG. 1 is a perspective view of a dog leash of the present invention.
Figure 2:
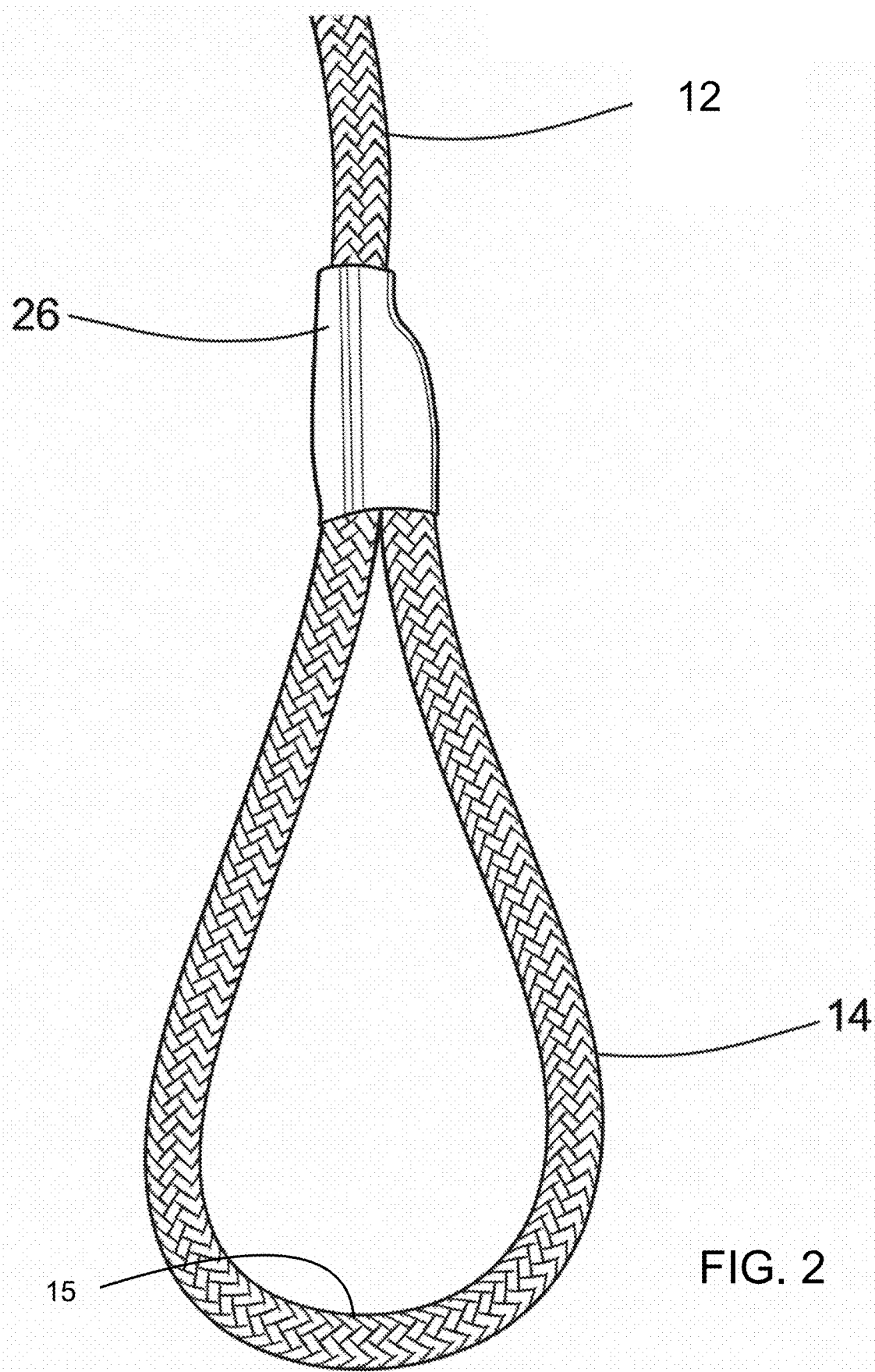
FIG. 2 is a perspective an enlarged view of a handle of the leash in FIG. 1.
Figure 3:
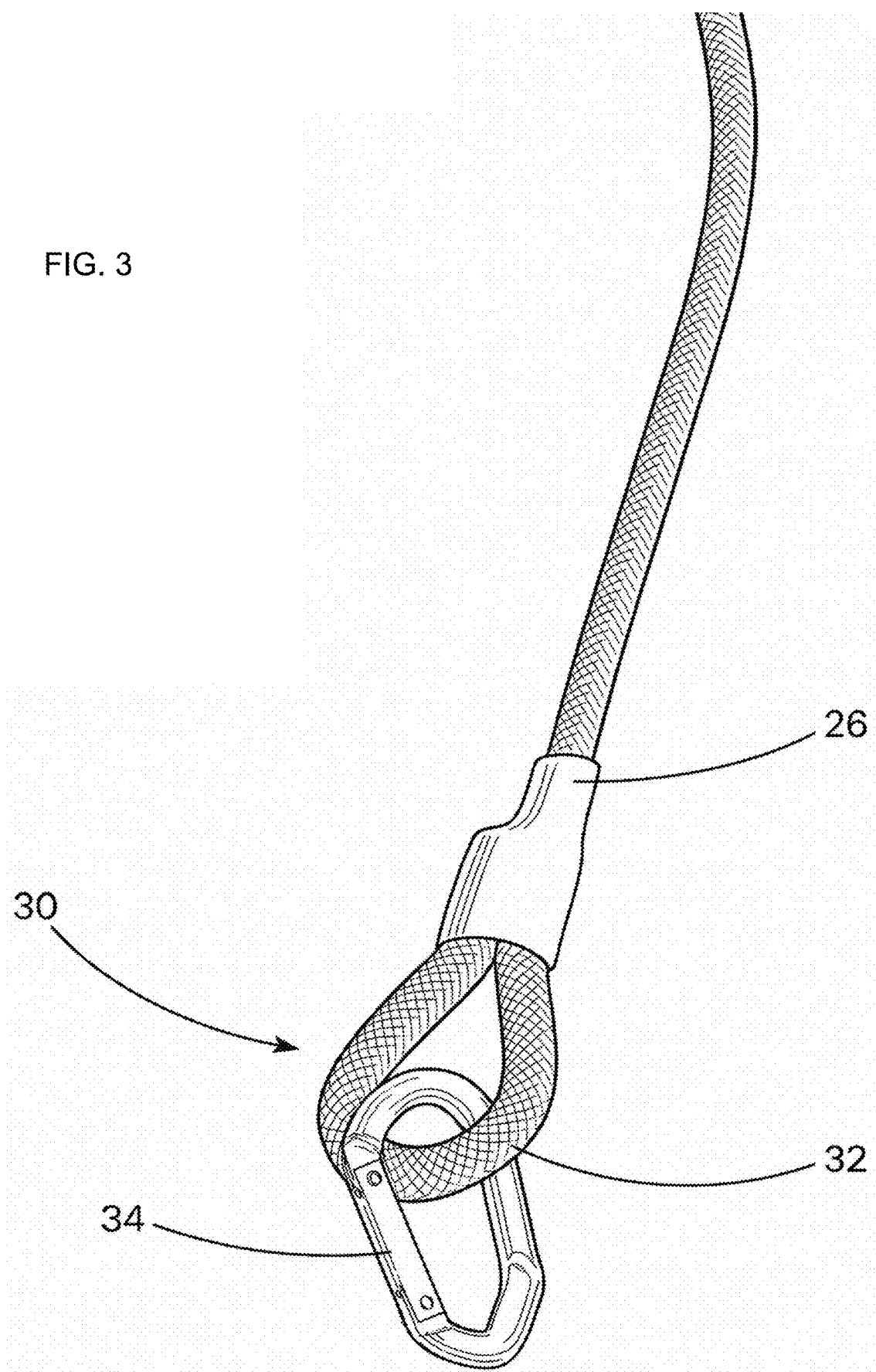
FIG. 3 is a perspective an enlarged view of an end of the leash with a carabiner according to one embodiment.
Figure 4:
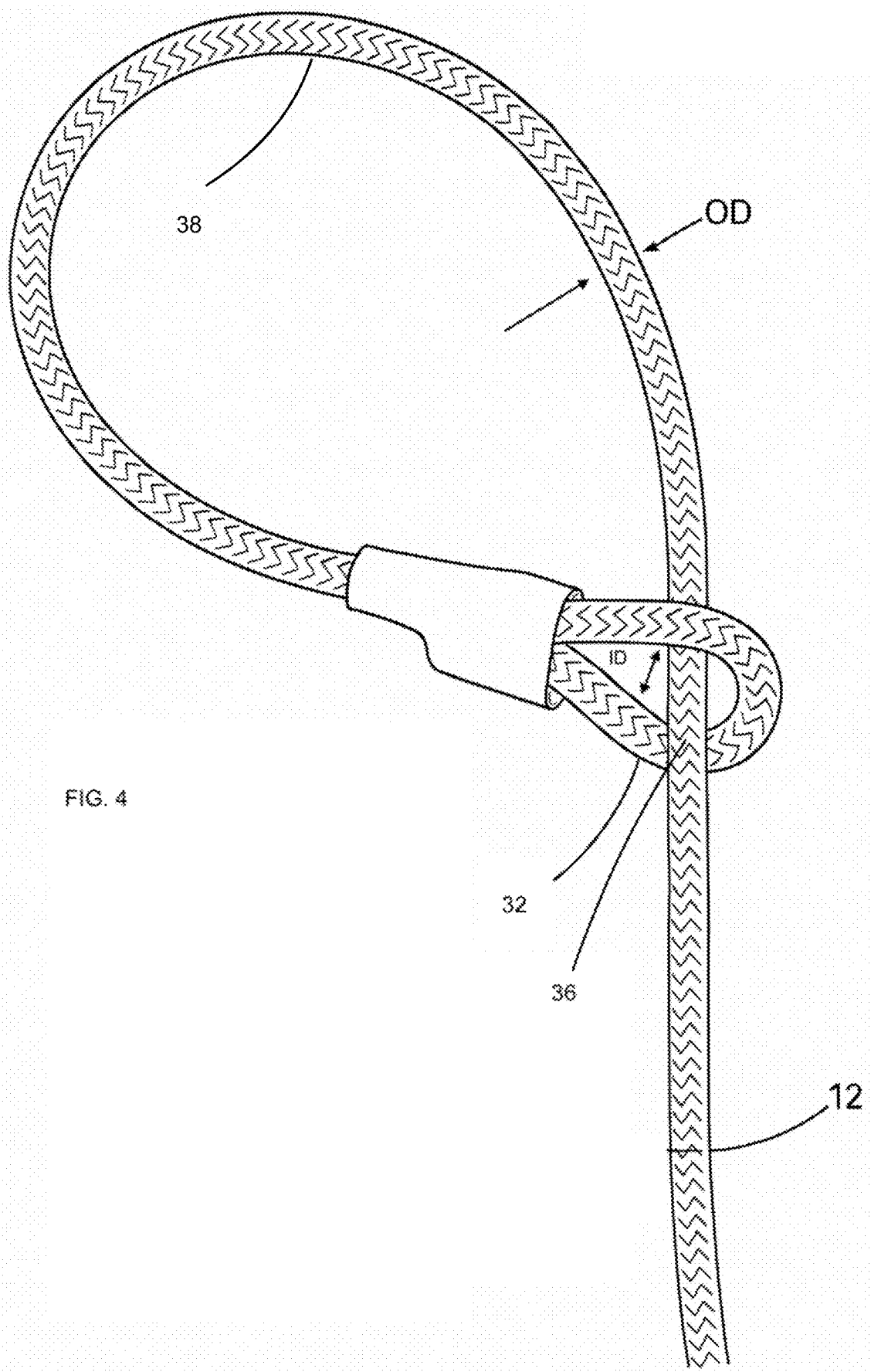
FIG. 4 is a perspective an enlarged view of an end of the leash with a slip noose according to another embodiment.
Figure 5:
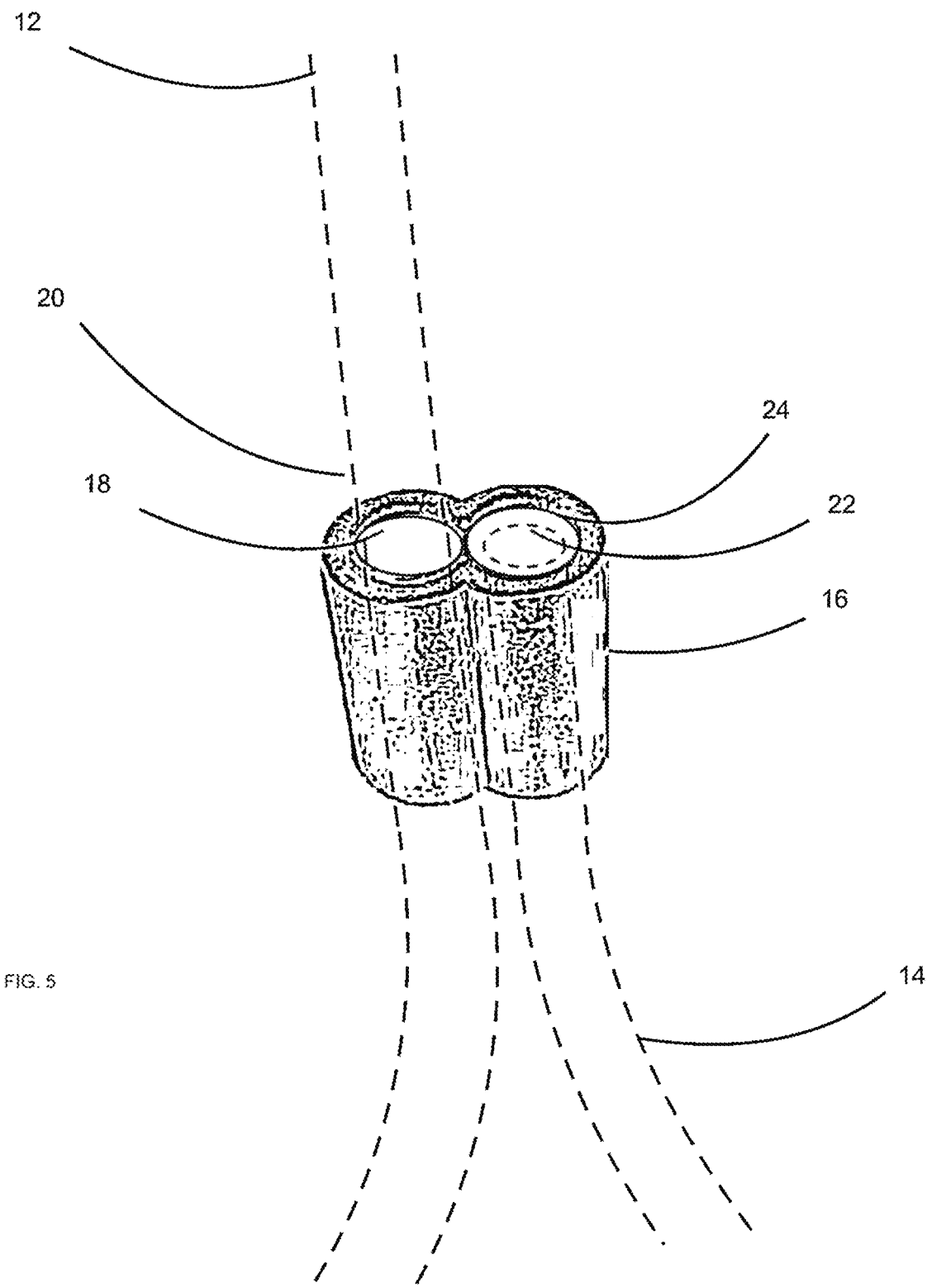
FIG. 5 is a perspective view of a metal retainer part of the invention.

Referring to the drawings, a leash according to invention is generally designated with the numeral 10. The leash 10 is formed of a flexible cord 12 which can preferably be a synthetic nylon or polyester woven material, of a minimum outer diameter OD of at least ⅜ inch to ½ inch. The leash cord 12 has a handle 15 formed at a first end 14. A metal retainer 16 as seen in FIG. 5 has a first cord receiving surface 18 receiving about an inwardly disposed portion 20 of the cord 12 distal from a terminal end portion 22 of the cord 12 and receiving about the terminal end portion 22 in a second receiving surface 24 of the metal retainer 16. The metal retainer 16 is crimped to retain respectively the inward disposed portion 20 and terminal end portion 22 to form the handle of the first end 14 of a size to enable one's hand to grasp the same. A heat shrinkable polymer tubing 26 is disposed over metal retainer 16 and portions and is heat shrunk to further assure retention of the portions as well as protect a user from potential injury in grasping about the metal retainer 16 when is necessary for handling the animal.

At a second end 30 of the cord is formed a smaller loop 32 with another retainer 16 in a similar manner to that above. In one embodiment the smaller loop 32 needs to be large enough to receive a carabiner 34 the through smaller loop 32. In this embodiment, the carabiner 34 can be used to connect to a conventional collar (not shown).

In another embodiment, the smaller loop 32 receives a mid portion 36 of the cord 12 to provide a slip noose 38. Here, it has been learned that with the coupling of the increased outer diameter OD cord and having the smaller loop 32 form with in inner diameter ID of at least about an inch, the cord 12 is able to more easily restrict and release as is needed and avoid the problems associated with injury or anxiety to the animal.

Thus formed is the slip noose 38 with improved functionality which can be placed over the head and neck of the dog to be walked with the leash 10. By virtue of the combined elements, namely the shrink wrap 26 and metal retainer 16 which ads weight and comfortable structure to the formed smaller loop 32, and the thicker cord 12, when force is not exerted on the leash 10 by either the dog or user, the noose 38 naturally relaxes to a point which does not pose a choke problem to the animal.

The leash 10 now can remain in a more simplistic form which is adaptable to various sized animals. For example, when a dog is walked, the portion of the leash 10 around the dog's neck will tighten if the dog attempts to escape, but immediately loosen when the dog ceases movement to a point within the leashes relaxed length.

In addition, the constructed leash 10 can also serve as a safety device. For example, in the construction of the instant leash design, it is contemplated that a user might find himself/herself in need of needing to climb a tree or surface terrain wherein the second end 30 might be wedged in a crevice and the handle 15 of first end 14 serving as a stirrup can be used to place one's foot in to gain elevation.

The present invention convertible and size adaptable dog leash 10 is preferably formed of a relatively flexible and soft braided cord 12, such as may be formed of nylon fiber and used in rock climbing application has been found to be satisfactory. By way of example, the materials for the leash 10 can include ⅜ inch diameter UIAA—International Climbing and Mountaineering Federation rope, 8 kn, 12 kn, 25 kn UIAA carabiner, double walled polymeric heat shrink and commercial aluminum swagger crimps for retainer 16. All leashes 10 are preferably tested to meet emergency equipment certification. The softness and flexibility provides easy handling and comfort for both the dog and the dog walker. Leash 10 can be formed of a single length of flexible cord 12.

The metal retainer 16 provides dual inner surfaces 18 and 24 which are preferably curved and upon crimping pinch the cord 12 to lock in place. Once coated with the heat shrink tubing 26, this provides a unique bulky surface about one's fingers can grasp with the handle 15 about the hand thereby giving a sure grip to maintain the animal.

While the description above discloses preferred embodiments of the present invention, it is contemplated that numerous variations and modifications of the invention are possible and are considered to be within the scope of the claims that follow.

The invention claimed is:

1. An animal leash, which includes:
   a cord which has a loop handle formed at a first end by virtue of a first metal retainer having a first cord receiving surface receiving about a first inwardly disposed portion of said cord distal from a terminal end portion of said cord and receiving about said terminal end portion in a second receiving surface of said first metal retainer, wherein said first metal retainer is crimped to retain respectively said first inwardly disposed portion and said terminal end portion to form said loop handle of a size to enable one's hand to grasp the same;
   a heat shrunken polymer tubing disposed over said first metal retainer and said first inwardly disposed portion and said terminal end portion to further assure retention of said first inwardly disposed portion and said first terminal end portion as well as protect a user from potential injury in grasping about said metal retainer when is necessary for handling an animal;
   a second loop smaller than said loop handle formed at a second end of said cord formed by virtue of a second metal retainer having a first cord receiving surface receiving about a second inwardly disposed portion of said cord distal from a second terminal end portion of said cord and receiving about said second terminal end portion in a second receiving surface of said second metal retainer, wherein said second metal retainer is crimped to retain respectively said second inwardly disposed portion and said second terminal end portion to form said smaller loop and wherein said smaller loop slidably receives a mid portion of said cord therethrough to provide a slip noose wherein said slip noose tightens about a neck of an animal upon force being exerted by one of a user and the animal through tension on said cord and upon release of tension said cord naturally relaxes said slip noose to a point which does not pose a choke problem to the animal while substantially retaining about a neck the animal to diminish risk of said leash from easily falling off a head of the animal; and
   a heat shrunken polymer tubing disposed over said second metal retainer and said second inwardly disposed portion and said second terminal end portion to further assure retention of said second inwardly disposed portion and said second terminal end portion as well as protect from potential injury.

2. The animal leash of claim 1, wherein said cord includes a synthetic nylon or polyester woven material.

3. The animal leash of claim 1, wherein said cord is of a diameter of between about at least ⅜ inch to ½ inch.

4. The animal leash of claim 1, wherein said smaller loop receives a carabiner.

5. The animal leash of claim 1, wherein said smaller loop receives a mid portion of said cord therethrough to provide a slip noose.

6. The animal leash of claim 1, wherein each first cord receiving surface and said second cord receiving surface include an arcuate surface.

* * * * *